Oct. 26, 1971      G. CANDELLERO      3,614,902

PLANETARY TRANSMISSION

Filed June 26, 1970      2 Sheets-Sheet 1

INVENTOR
GIOVANNI CANDELLERO

BY
ATTORNEYS

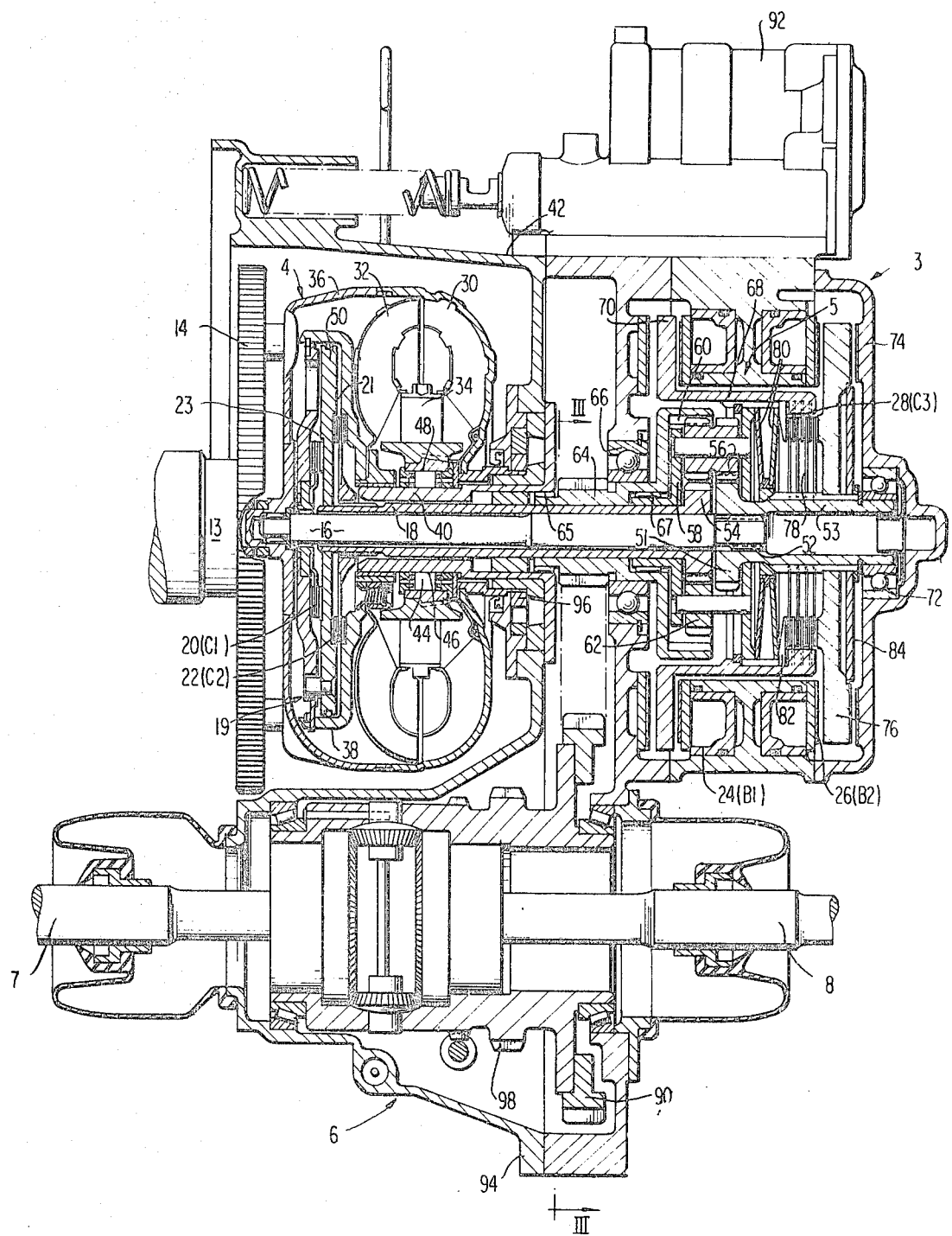

United States Patent Office 3,614,902
Patented Oct. 26, 1971

3,614,902
PLANETARY TRANSMISSION
Giovanni Candellero, Turin, Italy, assignor to Fiat
Societa per Azioni, Turin, Italy
Filed June 26, 1970, Ser. No. 50,210
Claims priority, application Italy, June 13, 1970,
69,039/70
Int. Cl. F16h 37/08, 47/08, 57/10
U.S. Cl. 74—695                                    4 Claims

ABSTRACT OF THE DISCLOSURE

An automatic transmission having a hydraulic torque converter and a planetary gear set drivingly connected thereto by means of a plurality of hydraulically actuated clutches positioned between the hydraulic torque converter and an engine and connected to the planetary gear set by means of a plurality of concentrically positioned input shafts. The output of the planetary gear set is through an output gear that is located concentrically around the input shafts and is positioned between the torque converter and the planetary gear set. A plurality of forward drive gear ratios and a reverse ratio is obtained by selectively engaging the clutch means positioned between the engine and the torque converter, as well as additional friction engaging devices positioned radially outwardly from the planetary gear set.

BACKGROUND OF THE INVENTION

Field of the invention

This invention relates to an automatic transmission for vehicles having transversely mounted engines. In particular, the invention relates to an automatic transmission of the type comprising a planetary gear set, a hydraulic torque converter for connecting the gear set to the engine, and having a differential placed adjacent to and parallel to the transmission, with a drive means between the output member of the transmission and the differential.

Description of the prior art

The current tendency among automobile manufacturers is to build vehicles having small engine capacity for economy purposes and to provide these vehicles with automatic or semi-automatic drives for increased operating comfort and convenience.

The use of such drives presents several problems from the manufacturing cost standpoint, as well as the availability of space, especially in vehicles having forwardly mounted transverse engines and transmissions with front wheel drive, or in vehicles having rearwardly mounted transverse engines and transmissions with rear wheel drive. In these cases, in view of the limited space available, problems are presented when the torque converter and the gearbox are mounted coaxially with the engine, as is customary in vehicles having longitudinally mounted forward engines with rear wheel drive.

The use of an automatic or semi-automatic drive in a vehicle having small engine capacity assumes the solution of another very important problem. Normally, such vehicles are supplied with a manually operated mechanical gearbox, with the automatic drive being available optionally and therefore must be mounted in the same space that is occupied by the mechanical gearbox.

Various prior art arrangements have been used for mounting automatic or semi-automatic transmissions in vehicles which have the engine mounted transversely in such a manner as to occupy the least possible space.

One of these prior art arrangements utilizes a semi-automatic transmission having a hydraulic torque converter arranged coaxially with thet engine crankshaft. The turbine of the torque converter drives a coaxially positioned shaft, connected in turn, by means of a radially positioned idler gear, to the input member of an epicycloid four-speed gear set, the axis of which is parallel to and spaced radially from that of the engine, the transmission gearing being located in the sump of the engine. In addition, the engine sump contains the differential housing. This housing is connected by its external ring gear to an output gear of the transmission.

The prior art construction described above has numerous disadvantages. The gear set, being located in the sump, is lubricated by the engine oil. This requires the use of special filters to filter the lubricating oil in such a way as to prevent metal fragments worn or chipped from the gears from damaging delicate mechanical parts of the engine.

According to another prior art construction, the gear set, again of the epicycloid type, is contained together with the differential housing in a closed housing separated from the sump. Consequently, the lubricant for lubricating the gear set is separated from that which lubricates the engine, with obvious advantages.

Although the last mentioned construction is satisfactory from the functional standpoint, it does present certain problems, due to the fact that the gear set is always disposed radially from and parallel to the axis of the engine crankshaft and the torque converter. The torque converter is generally mounted in axial alignment with the engine crankshaft and is directly connected to it. Consequently, gears or chains are necessary to transmit the output of the turbine of the torque converter to the input shaft of the gear set. This type of drive presents additional gear meshing points which, together with the numerous meshing points in the transmission gear set itself and the meshing points between the output of the gear set and the differential, are the sources of vibration and high noise level in the operation of the power train.

SUMMARY OF THE INVENTION

One object of the invention is to provide a transmission for vehicles with transversely mounted power units and having the drive wheels located nearby the power unit, the transmission having the least possible number of gear meshing points, to reduce the vibration and operating noise of the drive train.

Another object of the invention is to provide an automatic transmission for vehicles having transversely mounted power units, in which the engine, torque converter and transmission are in axial alignment with each other.

Another object of the invention is to provide an automatic transmission for transversely mounted power units, adapted to be easily substituted for a conventional manually operated mechanical transmission connected to the transverse power unit.

Still another object of the invention is to provide an automatic transmission which is practical, economical and at the same time, compact.

These and other features of the invention will be clear from the following description which refers to the accompanying drawings.

BRIEF DESCRIPTION OF THE DRAWINGS

FIG. 2 is a sectional view of the transmission and clutch arrangement according to the present invention;

DETAILED DESCRIPTION OF THE INVENTION

Figure 1:
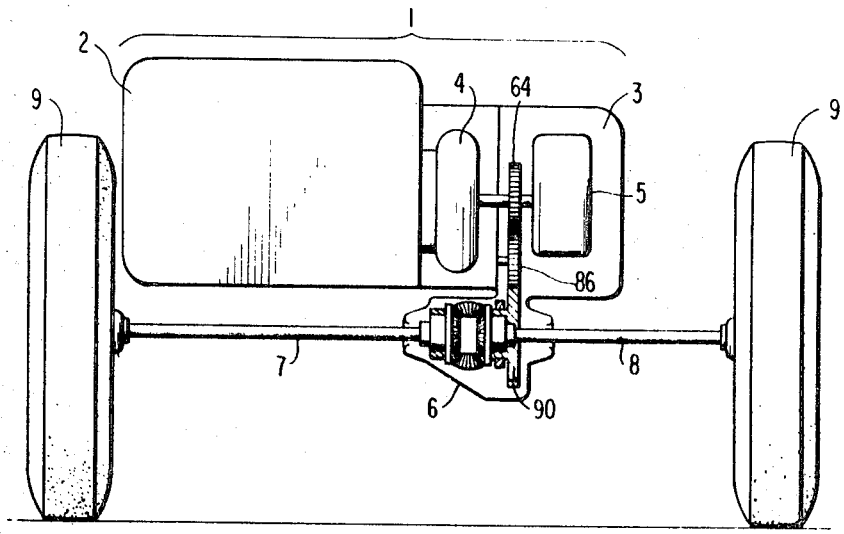
FIG. 1 is a schematic block diagram of a transverse engine and transmission arrangement according to the present invention.
Figure 3:
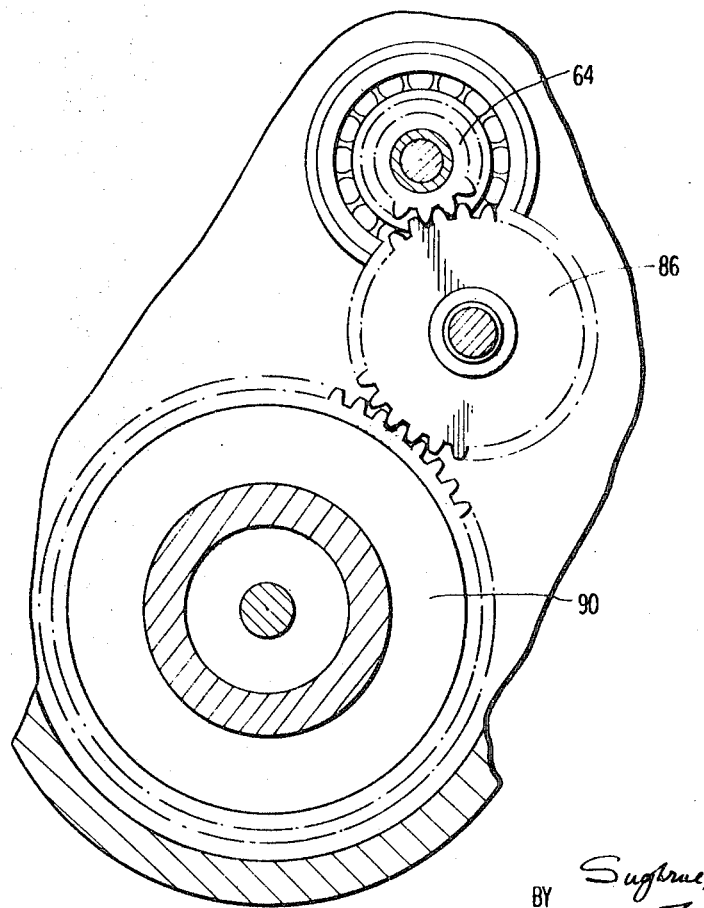
FIG. 3 is a sectional view of the output gearing along the line III—III of FIG. 2.

Referring now to FIG. 1, a power unit 1 consisting of an internal combustion engine 2 and an automatic transmission 3, is mounted transversely in a vehicle adjacent the driving wheels 9. The automatic transmission 3 includes a hydraulic torque converter 4 connected to the crankshaft of the internal combustion engine 2 and a planetary gear set 5 connected to the output of the torque converter 4 by means of friction engaging devices (not shown). Both the torque converter 4 and the planetary gear set 5 of the automatic transmission 3 are axially aligned with the crankshaft of internal combustion engine 2.

The output of the planetary gear set 5 is transmitted to the ring gear 90 of a differential unit 6 through an output gear 64 positioned between the torque converter 4 and the planetary gear set 5, and an idler gear 86. The differential unit 6 is mounted transversely in the vehicle below the power unit 1 at a point generally below the torque converter 4.

Two axle half-shafts or swing axles 7 and 8 extend from the differential unit 6 and are connected to the drive wheels 9 of the vehicle.

Referring now to FIG. 2 which shows the details of the construction of the automatic transmission according to the present invention, the transmission 3 comprises a torque converter 4 drivingly connected to an engine crankshaft 13. The output of the torque converter 4 is transmitted to the planetary gear set 5 by means of two concentrically arranged input shafts 16 and 18. Friction engaging devices in the form of hydraulically actuated clutches 20 and 22 positioned within the housing of the torque converter 4 adjacent the engine crankshaft 13, and hydraulically actuated friction brakes 24 and 26 connected to rotating members of the planetary gear set 5 are selectively engaged to obtain a plurality of forward speed gear ratios and a reverse speed gear ratio. In addition, a spring biased third clutch 28 is also used in conjunction with the hydraulically actuated friction brakes 24 and 26.

The torque converter 4 is comprised of a vaned pump or impeller driving unit 30, a vaned driven impeller or turbine 32, and a fixed vaned stator assembly 34. The pump or driving unit 30 is connected to the engine crankshaft 13 by means of the flexible driving disc 14 and the torque converter housing or cover 36. The torque converter housing is fluid tight and contains each of the torque converter elements 30, 32, and 34. The turbine 32 is connected to a rotating clutch housing 38 in which the hydraulically actuated friction clutches 20 and 22 are located. The stator assembly 34 is rotatably mounted on a stationary sleeve 40 that is fixed to the transmission casing 42, with a one-way brake 44 disposed between the stator 34 and the stationary sleeve 40.

The one-way brake 44 may be of conventional design that allows rotation of the stator 34 in a forward direction or the direction of rotation of the engine crankshaft 13 and torque converter pump 30 and prevents rotation of the stator 34 in the reverse direction by engaging the sprags or rollers of the one-way brake with the inner and outer races 46 and 48 connected to the stationay sleeve 40 and the stator assembly 34, respectively.

The hydraulically actuated clutch assembly 19 positioned between the torque converter elements and the engine crankshaft 13 is comprised of a first hydraulically actuated clutch 20 and a second hydraulically actuated clutch 22 contained within a single rotating clutch housing 38. The clutch discs 20 and 22 are positioned on either side of an axially movable clutch apply member 50 that is sealingly positioned within the rotating housing 38.

The output of the turbine 32 of the torque converter 4 is transmitted to the planetary gear set 5 through either a first input shaft 16 or a second input shaft 18 by selectively engaging the hydraulically actuated clutches 20 or 22. The planetary gear set 5 is comprised of a first sun gear 51 drivingly connected with the first input shaft 16 by means of a splined connection 52, and has an axially extending sleeve or collar, the purposes of which will be more fully described hereinafter. A second sun gear 54 is connected with the second, or outer, input shaft 18. The first sun gear 51 meshes with a plurality of first planetary gears 56 rotatably carried by a carrier member 58 which is rotatably supported within the transmission housing 42 by means of bearings 66 and 67. The first planetary gears 56, in turn, mesh with an outer ring gear 60, which is rotatably supported in transmission housing 42 by a bearing 66. The second sun gear 54 rotatably meshes with a second set of planetary gears 62, which are also rotatably mounted on the rotatable carrier member 58. The second set of planetary gears 62, in turn, mesh with the first planetary gears 56, rather than with a ring gear. The output of the planetary gear set 5 is transmitted by the ring gear 60 to an output gear 64, which is rotatably supported within the transmission housing 42 by bearings 65 and 66. The output gear 64 is rotatably located concentrically around the input shafts 16 and 18 and is axially positioned between the torque converter 4 and the planetary gear set 5.

A rotating drum 68 surrounds the planetary gears 56 and 62 and the ring gear 60 and is splined to the carrier member 58 for rotation therewith. The splined connection allows the rotating drum 68 to move axially with respect to the carrier member 58. A radially extending flange member 70 is formed on one end of the rotating drum 68 for engagement with the hydraulically actuated brake 24 upon the application of hydraulic pressure thereto to stop rotation of the carrier member 58.

The first sun gear 51, which is shown as having a splined connection with the first input shaft 16, has a sleeve portion 53 which extends axially in a direction opposite the first input shaft 16 and is supported by means of a bearing 72 located in the removable transmission end cover 74. A friction engaging member 76 is slidably splined on the extension or sleeve 53 of the first sun gear 51 for engagement with the second hydraulically actuated friction brake 26 upon the application of hydraulic pressure thereto. In addition, a plurality of clutch discs 78 are also splined on the sleeve portion 53 of the first sun gear 51 between the gear itself and the friction engaging member 76. These clutch discs are normally held in friction engagement with corresponding clutch discs carried by splines or grooves on the inside diameter of the rotating drum 68 by means of springs, such as Belleville springs 80 positioned adjacent the clutch discs 78 on one side and Belleville spring 84 applying a force to friction engaging member 76, so that the carrier 58 is normally locked for unitary rotation with the first sun gear 51. Note that a stop member 82, which may be in the form of a snap ring or the like, is used to limit the movement of the inner Belleville springs 80 in such a manner that when the second hydraulically actuated brake 26 is applied, the friction engaging member 76 will be moved to the right as seen in FIG. 2, so that the applied pressure of the springs will be released from the rotating clutch discs 78, thereby disengaging the spring applied third clutch 28 and allowing the carrier 58 to rotate separately from the first sun gear 51.

As stated previously, the output of the planetary gear set 5 is transmitted through the ring gear 60 to an output gear 64 positioned concentrically around the input shafts 16 and 18 between the torque converter 4 and the planetary gear set 5. An idler gear 86 is used to connect the output gear 64 with the differential ring gear 90. However, a chain drive can be substituted for the idler gear in the present invention.

A hydraulic control system 92, the details of which are not shown, is used to automatically control the engagement and disengagement of the hydraulically actuated friction engaging devices 20, 22, 24 and 26, and spring biased clutch 28 to obtain three forward gear ratios and a reverse gear ratio in response to vehicle operating conditions or manually selected gear ratios. The automatic operation of the hydraulic control system 92 is controlled by an electronic governor assembly which utilizes an electronic speed sensing means which may be positioned in or on the transmission housing 42 or the differential case 94 radially outwardly from a gear 98 which is positioned adjacent to and driven by the differential ring gear 90 to sense the speed of rotation of the differential ring gear 90. This speed sensor may take the form of a speed pickup device which generates a plurality of pulses which vary in frequency in response to the rotational speed of the gear teeth. Another type of speed pickup device which may be used is one which senses magnetic pulses created by a magnet located on or driven by the rotating gear 98. The speed pickup device can be mounted on or inserted into the transmission housing 42 or differential case 94 from the outside to give ready accessibility for adjustment or repair purposes.

The operation of the transmission according to the present invention is as follows. When the manual gear selector (not shown) is placed in the neutral position and the engine 2 is started, hydraulic pressure is supplied by a hydraulic pump 96 which is located in the transmission housing 42 behind the torque converter 4 and is driven by the engine 2 through the torque converter cover assembly 36 to supply hydraulic pressure to the hydraulic control system 92. In the neutral position, the hydraulic control system 92 supplies pressure through internal passages within the transmission housing 42 to the first hydraulically actuated friction brake 24. Simultaneously, hydraulic pressure is supplied to the chambers 21 and 23 on both sides of the clutch apply member 50 containing both the first and second hydraulically actuated clutches 20 and 22, thereby causing the clutch apply member 50 to be maintained in a neutral position. The hydraulic pressure to the second clutch apply chamber 23 on the left side of the apply member 50 is supplied through a clearance between the inner, or first input shaft 16 and the outer or second input shaft 18, while the hydraulic pressure supplied to the right hand or first clutch apply chamber 21 is supplied through the clearance between the outer, or second input shaft 18 and the surrounding stationary sleeve 40. Thus, no input power is transmitted from the torque converter 4 to either of the two input shafts 16 or 18. In addition, since hydraulic pressure is also being supplied to the first hydraulically actuated friction brake 24, the rotating drum member 68 is caused to move to the left, thereby releasing the spring pressure normally applying the spring biased third clutch 28. Thus, no power can be transmitted through the planetary gear set 5.

To obtain the first gear ratio, hydraulic pressure is supplied to the left hand apply chamber 23 of the hydraulically actuated clutch assembly 19 to move the clutch apply member 50 to the right and engage the second hydraulically actuated clutch 22, thereby drivingly connecting the second, or outer input shaft 18 to the torque converter turbine 32. Simultaneously, hydraulic pressure is supplied to the first hydraulically actuated friction brake 24 to engage the flange 70 of the rotating drum member 68 and cause the carrier member 58 of the planetary gear set 5 to be locked from rotation in either direction. Since the drum member 68 is moved axially to the left, the spring pressure of Belleville springs 80 is released from the spring biased clutch 28, thereby releasing the clutch 28 and allowing the first sun gear 51 to move freely with respect to the carrier 58. Power is therefore transmitted from the engine crankshaft 13 through the torque converter 4 to the outer, or second input shaft 18 connected to the second sun gear 54. The second sun gear 54 meshes with the second set of planetary gears 62, which in turn, mesh with the first planetary gears 56. Since the carrier 58 is held from rotation in either direction, it acts as a reaction member and the ring gear 60 is caused to rotate in the same direction as the second sun gear 54 at a reduced speed ratio. The output is then transmitted from the ring gear 60 to the output gear 64 to obtain first speed gear ratio.

Second speed gear ratio is obtained by supplying hydraulic pressure to the left hand or second clutch chamber 23 of the hydraulically actuated clutch assembly 19 to cause the clutch apply member 50 to be moved to the right to engage the second hydraulically actuated clutch 22 in the same manner as done in the first speed gear ratio. Hydraulic pressure is also supplied to the second hydraulically actuated friction brake 26 which causes the friction brake 26 to engage the friction engaging member 76 splined to the sleeve of the first sun gear 51, thereby locking the first sun gear 51 against rotation in either direction. When the second hydraulically actuated friction brake 26 is applied, the friction engaging member 76 moves to the right to release the spring pressure of Belleville spring 84 from the spring biased third clutch 28, thereby releasing the engagement of the third clutch 28. The engine driving power is transmitted from the engine crankshaft 13 through the torque converter 4 to the outer, or second input shaft 18 through the second hydraulically actuated clutch 22. The second input shaft transmits the driving power to the second sun gear 54 which meshes with the second set of planetary gears 62. The second set of planetary gears 62 are in mesh with the first set of planetary gears 56 which, in turn, are in mesh with the first sun gear 51, now held stationary by application of the second hydraulically actuated friction brake 26 engaging the friction engaging member 76. Since the first sun gear 51 is held stationary, it acts as a reaction member. Therefore, the second sun gear 54 drives the second set of planetary gears 62, which, in turn, cause the first planetary gears 56 to "walk" around the stationary first sun gear 51, thereby driving the ring gear 60 connected to the output gear 64 in the same direction of rotation as the second sun gear 54 at a reduced speed. However, since the carrier 58 is rotating about the stationary first sun gear 51, the gear reduction is not as great as that obtained in the first gear ratio.

To obtain the third speed gear ratio, hydraulic pressure is supplied to the left hand apply chamber 23 of the hydraulically actuated clutch assembly 19 to apply the second hydraulically actuated clutch 22 and transmit power from the torque converter 4 through the second input shaft 18 to the second sun gear 54. In the third speed gear ratio position, no hydraulic pressure is applied to either of the hydraulically actuated friction brakes 24 or 26. Thus, the spring biased third clutch assembly 28 remains engaged and locks the first sun gear 51 for rotation with the carrier member 58. Since two members of the planetary gear set 5 are locked together, all of the members of the planetary gear set 5 rotate together, thus causing the ring gear 60 to rotate at the same speed as the second sun gear 54. Unitary drive, or third speed gear ratio, is thus obtained.

To obtain reverse drive, hydraulic pressure is supplied to the right hand or first clutch chamber 21 of the hydraulically actuated clutch assembly 19 to move the clutch apply member 50 leftwardly to engage the first hydraulically actuated clutch 20. Simultaneously, hydraulic pressure is applied to the first hydraulically actuated friction brake 24 to engage the radially extending flange member 70 of the rotating drum 68, thereby causing the carrier member 58 of the planetary gear set 5 to be held stationary against rotation in either direction. When the drum 68 is moved leftwardly by the application of the hydraulically actuated friction brake 24, the spring apply pressure of the Belleville springs 80 is released from the spring biased third clutch 28, thereby disengaging the third clutch assembly and allow the first sun gear 51 to rotate separately from the carrier member 58. Power is transmitted from the engine crank shaft 13 through the torque converter 4 to the inner or first input shaft 16 by way of the first hydraulically actuated clutch 20. The first input shaft 16 drives the first sun gear 51 which is in mesh with the first set of planetary gears 56. Since the carrier member 58 is held stationary against rotation by the application of the hydraulically actuated friction brake 24, it acts as a reaction member and the first planetary gears 56 are caused to rotate about their own axis in a direction opposite the direction of rotaion of the first sun gear 51, thereby causing the ring gear 60 to be rotated in the opposite direction of the rotation of the first sun gear 51 at a reduced speed ratio. The power is then transmitted from the ring gear 60 to the output gear 64 in the reverse direction in order to obtain the reverse speed gear ratio.

What is claimed is:

1. An automatic transmission for vehicles comprising, a torque converter assembly having an input and an output, a planetary gear set having an input means and an output means, said planetary gear set including a first and a second sun gear, a rotatable carrier, and a ring gear, said rotatable carrier having at least one first and second planetary gears rotatably mounted thereon, said first planetary gear rotatably engaging said first sun gear, said second planetary gear and said ring gear, said second planetary gear rotatably engaging said second sun gear and said first planetary gear, said input means of said planetary gear set including a first input shaft operatively connected with said first sun gear and a second input shaft operatively connected with said second sun gear, said second input shaft positioned concentrically around said first input shaft, a first and a second hydraulically actuated clutch for selectively obtaining driving connections between the output of said torque converter assembly and said first and second input shafts, respectively, said torque converter assembly axially positioned between said first and second clutches and said planetary gear set, said output means of said planetary gear set being operatively connected to said ring gear of said planetary gear set and positioned concentrically around said second input shaft and axially between said torque converter assembly and said planetary gear set, a first and a second hydraulically actuated brake means positioned concentrically around said planetary gear set, said first hydraulically actuated brake means being operatively connected to said carrier of said planetary gear set, said second hydraulically actuated brake means being operatively connected to said first sun gear with said carrier when said first and second hydraulically actuated brake means are disengaged and disconnecting said first sun gear from said carrier when either of said first and second hydraulically actuated brake means are engaged, and a hydraulic control system communicating with said hydraulically actuated clutches and brake means for selectively controlling the application of said clutches and brake means for obtaining a plurality of gear ratios from said planetary gear set.

2. An automatic transmission as claimed in claim 1, wherein said third clutch means comprises a plurality of clutch plates alternately connected to said first sun gear and said carrier, and a spring biasing means for applying a force to maintain engagement of said clutch plates, said spring force being released from said clutch plates when either of said first or second hydraulically actuated brake means is applied, whereby said third clutch means is released to disconnect said first sun gear from said carrier.

3. An automatic transmission as claimed in claim 1, further comprising a differential unit drivingly connected to said output means of said planetary gear set and a single housing means for containing said torque converter assembly, said planetary gear set and said differential unit.

4. An automatic transmission as claimed in claim 3, wherein the longitudinal axis of the output of said differential unit is parallel to and spaced radially from the longitudinal axis of said torque converter assembly and said planetary gear set.

References Cited

UNITED STATES PATENTS

| 3,132,536 | 5/1964 | Sampietro | 74—700 |
| 3,254,544 | 6/1966 | Maurice et al. | 74—732 |
| 3,474,690 | 10/1969 | Lepelletier | 74—695 X |
| 3,482,469 | 12/1969 | Mori | 74—688 |
| 2,671,359 | 3/1954 | Scheiter. | |
| 3,051,017 | 8/1962 | Flinn. | |

FOREIGN PATENTS

| 1,054,853 | 4/1959 | Germany. |

CARLTON R. CROYLE, Primary Examiner

T. C. PERRY, Assistant Examiner

U.S. Cl. X.R.

74—730, 763; 192—18 A